(12) United States Patent
Aoki et al.

(10) Patent No.: US 8,249,189 B2
(45) Date of Patent: Aug. 21, 2012

(54) WIRELESS TRANSMISSION METHOD AND APPARATUS

(75) Inventors: Tsuguhide Aoki, Kawasaki (JP); Yoshimasa Egashira, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 112 days.

(21) Appl. No.: 12/823,793

(22) Filed: Jun. 25, 2010

(65) Prior Publication Data
US 2010/0260288 A1   Oct. 14, 2010

Related U.S. Application Data

(63) Continuation of application No. PCT/JP2009/051151, filed on Jan. 20, 2009.

(30) Foreign Application Priority Data

Jan. 31, 2008 (JP) ................................ 2008-022008

(51) Int. Cl.
*H04K 1/02* (2006.01)

(52) U.S. Cl. .......... 375/296; 375/260; 455/69; 455/427; 455/63.1; 455/126

(58) Field of Classification Search .................. 375/296, 375/260; 455/126, 427, 69
See application file for complete search history.

(56) References Cited

U.S. PATENT DOCUMENTS

| | | | |
|---|---|---|---|
| 2007/0135051 A1* | 6/2007 | Zheng et al. ............... | 455/63.1 |
| 2007/0253508 A1 | 11/2007 | Zhou et al. ................. | 375/267 |
| 2008/0108310 A1* | 5/2008 | Tong et al. ................. | 455/69 |
| 2011/0096704 A1* | 4/2011 | Erell et al. ................. | 370/295 |
| 2011/0274208 A1* | 11/2011 | Khojastepour et al. ..... | 375/296 |

FOREIGN PATENT DOCUMENTS

EP   1 737 176 A1   12/2006

OTHER PUBLICATIONS

International Search Report and Written Opinion dated Sep. 1, 2009 from PCT/JP2009/051151.
Hochwald, et al., "*A Vector-Perturbation Technique for Near-Capacity Multiantenna Multiuser Communication—Part II: Perturbation*", IEEE Transactions on Communications, vol. 53, No. 3, pp. 537-544, Mar. 2005.
Windpassinger, et al., "*Precoding in Multiantenna and Multiuser Communications*", IEEE Transactions on Wireless Communicatoins, vol. 3, No. 4, pp. 1305-1316, Jul. 2004.
Caire, et al., "*On the Achievable Throughput of a Multiantenna Gaussian Broadcast Channel*", IEEE Transactions on Information Theory, vol. 49, No. 7, pp. 1691-1706, Jul. 2003.

* cited by examiner

*Primary Examiner* — Eva Puente
(74) *Attorney, Agent, or Firm* — Ohlandt, Greeley, Ruggiero & Perle, L.L.P.

(57) ABSTRACT

According to one embodiment, a wireless transmission method is disclosed. The method can perform feedback loop processing including subtracting a feedback data signal obtained by multiplying a feedback processing data signal by a gain from an input data signal to generate the feedback processing data signal. The method can perform beam forming processing with respect to the feedback processing data signal and at least one pilot signal for channel estimation to generate a beam-formed signal. In addition, the method can transmit the beam-formed signal by a plurality of antennas. Precoding processing performed on the pilot signal is only beam forming processing.

14 Claims, 8 Drawing Sheets

WIRELESS TRANSMISSION METHOD AND APPARATUS

CROSS-REFERENCE TO RELATED APPLICATIONS

This is a Continuation application of PCT Application No. PCT/JP2009/051151, filed Jan. 20, 2009, which was published under PCT Article 21(2) in Japanese.

This application is based upon and claims the benefit of priority from Japanese Patent Application No. 2008-022008, filed Jan. 31, 2008; the entire contents of which are incorporated herein by reference.

FIELD

Embodiments described herein relate generally to a wireless transmission method and apparatus that perform transmission of a plurality of signals in particular.

BACKGROUND

Spatial division multiple access (SDMA) that multiplexes a plurality of users at the same frequency and the same time by using a plurality of transmit antennas is known as a technology that can effectively exploit frequency resources. There is known zero-forcing (ZF)-SDMA that applies this technology to a wireless communication system which performs communication with a base station and a plurality of users (wireless terminals) and enables reception of transmitted signals for the respective users alone without interfering with the plurality of users.

ZF-SDMA is a criterion that suppresses interferences from other users, and it multiplies a transmitted signal by a weight W corresponding to an inverse matrix of a matrix representing a state of a plurality of propagation paths between a plurality of transmit antennas and a plurality of users (which will be referred to as a channel matrix hereinafter) to effect beam forming in a base station, thereby suppressing interferences. Since ZF-SDMA uses a degree of freedom of each transmit antenna for suppression of interferences in this manner, transmission power is increased and excellent diversity performance cannot be obtained. That is, considering a user 1 and a user 2 as wireless terminals, when it is assumed that a zero direction of a transmission beam is set to, e.g., a direction of the user 2 in order to suppress an interference with the user 2 with respect to a transmitted signal for the user 1, a maximum amplitude direction of a transmission beam for the user 2 does not necessarily coincide with a direction of the user 2.

In G. Caire and S. Shamai (Shitz), "On the achievable throughput of a multiantenna Gaussian broadcast channel," IEEE Trans. on Info. Theory, vol. 49, No. 7, pp. 1691-1706, July 2003. (Document 1), DPC (Dirty Paper Coding)-SDMA that solves this problem is proposed. In the DPC-SDMA scheme, Q obtained by performing QR decomposition with respect to $H^H$ that is a Hermitian transposition of a channel matrix H is used as a weight W for beam forming. Since Q is an orthogonal matrix, an increase in transmission power that is a problem in ZF-SDMA does not occur. When a transmitted signal is multiplied by the weight W based on beam forming, the wireless terminal of the user 1 receives a transmitted signal for the user 1 alone, and the wireless terminal of the user 2 receives both the transmitted signal for the user 1 and a transmitted signal for the user 2.

In this case, a signal is transmitted to the user 1 with a transmission beam that provides a maximum gain in the wireless terminal of the user 2. Therefore, the interference does not have to be suppressed with respect to the user 1, and hence transmission with a beam synthesized at a maximum ratio is enabled, thus improving performance beyond those of ZF-SDMA. At this time, a diversity order of the wireless terminal of the user 1 becomes 2. Here, since the transmission beam for the user 1 does not take the wireless terminal of the user 2 into consideration, the transmitted signal for the user 1 is also transmitted to the user 2. On the other hand, the transmitted signal for the user 2 does not reach the wireless terminal of the user 1 since the interference with the wireless terminal of the user 1 must be suppressed, but this transmitted signal does not reach the wireless terminal of the user 2 with a maximum gain either, and a diversity order of the wireless terminal of the user 2 becomes 1.

The transmitted signal for the user 1 interferes with the wireless terminal of the user 2 if nothing is done. To avoid this interference problem, precoding based on feedback processing is performed with respect to each transmitted signal in DPC-SDMA. Using both beam forming and precoding in this manner allows the wireless terminals of the user 1 and the user 2 to communicate with the base station without interferences. In this case, the diversity order of the wireless terminal of the user 1 becomes 2, and the diversity order of the wireless terminal of the user 2 becomes 1. On the other hand, in ZF-SDMA, both the users have the diversity order of 1. Therefore, it can be said that DPC-SDMA is a scheme that is superior to ZF-SDMA. However, DPC-SDMA has a problem that transmission power is increased when precoding is effected for elimination of interferences alone.

On the other hand, in C. Windpassinger, R. Fischer, T. Vencel, and J. B. Huber, "Precoding in multiantenna and multiuser communications," IEEE Trans. Wireless Communication, vol. 3, No. 4, pp. 1305-1316, July 2004. (Document 2), a transmission power reduction method using Tomlinson-Harashima Precoding (THP) is proposed. This is a method of performing such modulo arithmetic as provided in THP to reduce transmission power. This scheme will be referred to as THP-SDMA hereinafter. THP-SDMA can multiplex users at the same time and the same frequency without increasing transmission power and improve a reception quality as compared with general SDMA schemes.

When decoding a signal transmitted based on THP-SDMA on a reception side, the received signal must be divided by a gain (a reception gain) corresponding to a channel response on the reception side. Since the gain corresponding to the channel response is not known on the reception side, a pilot signal must be used from a transmission side to inform the reception side of the gain in advance. In this case, how the pilot signal is transmitted in THP-SDMA is a problem.

It is known that, when transmitting the pilot signal in conventional ZF-SDMA, the same weight as that used in transmission of a data signal for beam forming is utilized. When the same technique is applied to THP-SDMA, performing the modulo arithmetic with respect to the pilot signal to avoid an increase in transmission power results in occurrence of the following problem.

When performing channel estimation using a pilot signal, a received signal is divided by a known pilot signal to obtain a channel estimated value on the reception side. However, when the modulo arithmetic is carried out on the transmission side to pilot signals, the channel estimated value greatly deviates from an original value, thus extremely degrading reception performances.

On the other hand, when a pilot signal is transmitted without performing the modulo arithmetic, a channel estimated value can be correctly calculated, but increased transmission power must be normalized, and hence a reception level of the

DETAILED DESCRIPTION

In general, according to one embodiment, a wireless transmission method is disclosed. The method can perform feedback loop processing including subtracting a feedback data signal obtained by multiplying a feedback processing data signal by a gain from an input data signal to generate the feedback processing data signal. The method can perform beam forming processing with respect to the feedback processing data signal and at least one pilot signal for channel estimation to generate a beam-formed signal. In addition, the method can transmit the beam-formed signal by a plurality of antennas. Precoding processing performed on the pilot signal is only beam forming processing.

Embodiments will now be explained hereinafter in detail with reference to the drawings.

(First Embodiment)

Outline structures of a wireless transmission apparatus and a wireless reception apparatus according to a first embodiment will be first explained.

<Wireless Transmission Apparatus>

Figure 1:
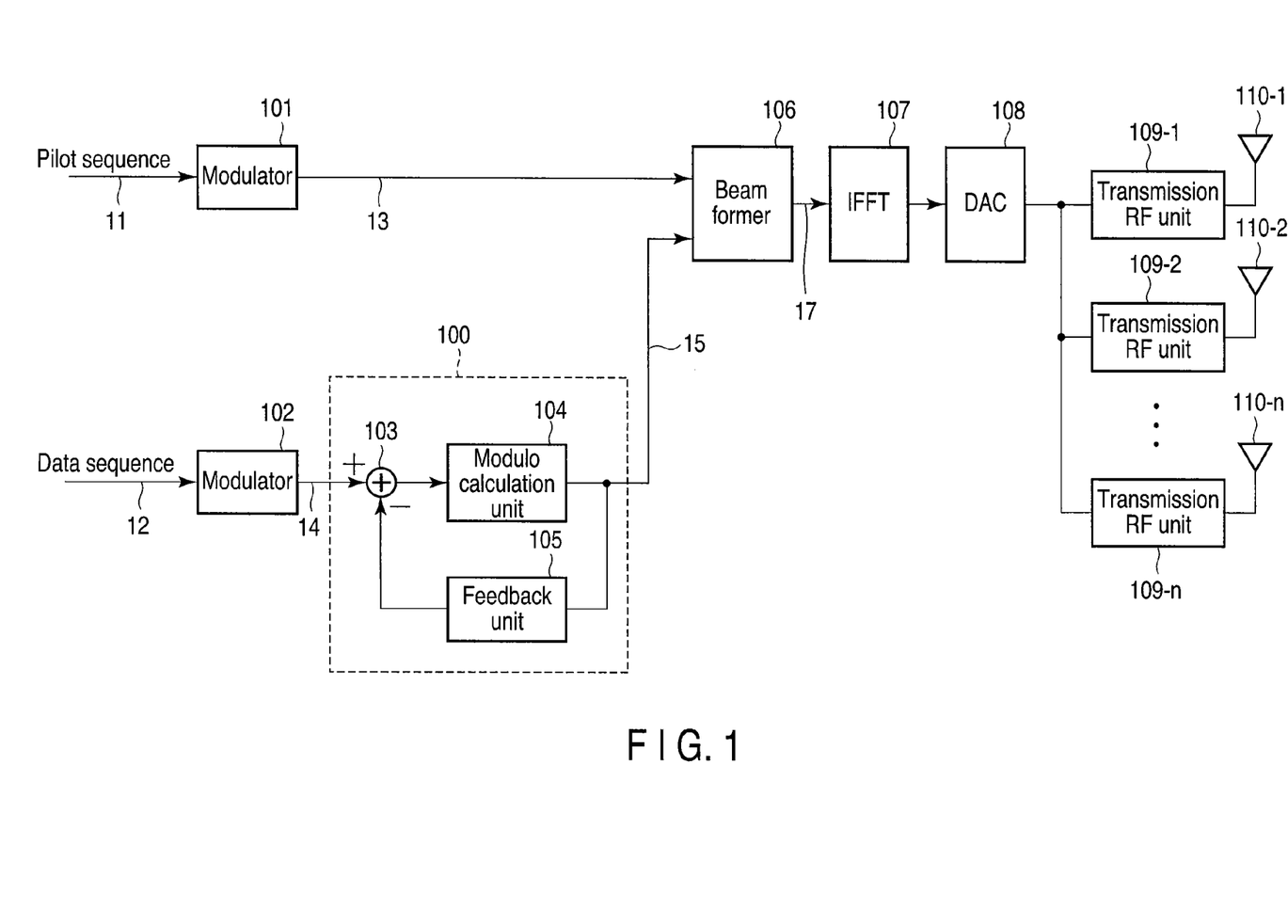
FIG. 1 is a block diagram showing a wireless transmission apparatus according to a first embodiment.

FIG. 1 shows a wireless transmission apparatus using THP-SDMA according to a first embodiment. A pilot sequence 11 and a data sequence 12 are modulated by modulators 101 and 102 to generate modulation symbols, i.e., a pilot signal 13 and a data signal 14, respectively. The modulators 101 and 102 utilize various kinds of conventionally known digital modulation schemes, e.g., BPSK (Binary Phase Shift Keying), QPSK (Quadrature Phase Shift Keying), ASK (Amplitude Shift Keying), FSK (Frequency Shift Keying), 16 QAM (16 Quadrature Amplitude Modulation), or 64 QAM.

The pilot signal 13 output from the modulator 101 is directly input a beam former 106. On the other hand, the data signal 14 output from the modulator 102 is processed by a feedback loop 100 including a subtracter 103, a modulo calculation unit 104, and a feedback unit 105. In the subtracter 103, a feedback data signal from the feedback unit 105 is subtracted from the data signal 14. The modulo calculation unit 104 performs modulo arithmetic with respect to a data signal output from the subtracter 13. The modulo arithmetic described here is somewhat different from general (narrowly-defined) modulo arithmetic unit, and hence a detail thereof will be explained later.

A data signal (a feedback processing data signal) 15 output from the modulo calculation unit 104 in the feedback loop 100 is supplied to a later-explained beam former 106 and the feedback unit 105. In the feedback unit 105, the feedback processing data signal 15 is multiplied by a given gain to generate a feedback data signal.

On the other hand, in the beam former 106, processing of forming a transmission beam for a plurality of users (wireless terminals), i.e., beam forming processing is carried out with respect to the pilot signal 13 and the feedback processing data signal 15 from the feedback loop 100. When using orthogonal frequency-division multiplexing (OFDM) transmission or orthogonal frequency-division multiplexing access (OFDMA), the pilot signal and the data signal after beam forming processing, i.e., a beam-formed signal 17 is converted into an OFDM signal by an inverse fast Fourier transformer (IFFT) unit 107, then converted into an analog signal by a digital-to-analog converter (DAC) 108, and input to a plurality of (n) transmission RF (Radio Frequency) units 109-1 to 109-$n$. It is to be noted that, in case of single-carrier transmission, i.e., in case of using no multi-carrier transmission like OFDM transmission or OFDMA transmission, the IFFT unit 107 is not required and an output signal from the beam former 106 is directly input to the DAC 108. It is to be noted that a digital filter for band limiting may be provided on a previous stage of the DAC 108 in any case.

The beam-formed OFDM signal converted into an analog signal from the DAC 108 is transmitted by the plurality of (n) transmission units. The transmission units include transmission RF units 109-1 to 109-$n$ and antennas 110-1 to 110-$n$. Each of the transmission RF units 109-1 to 109-$n$ includes a frequency converter (an up-converter), a power amplifier, and a filter as required. The beam-formed OFDM signal converted into the analog signal from the DAC 108 is up-converted into a frequency in an RF band by each of the transmission RF units 109-1 to 109-$n$, further subjected to power amplification, and then fed to each of the transmit antennas 110-1 to 110-$n$ to be transmitted.

<Wireless Reception Apparatus>

Figure 2:
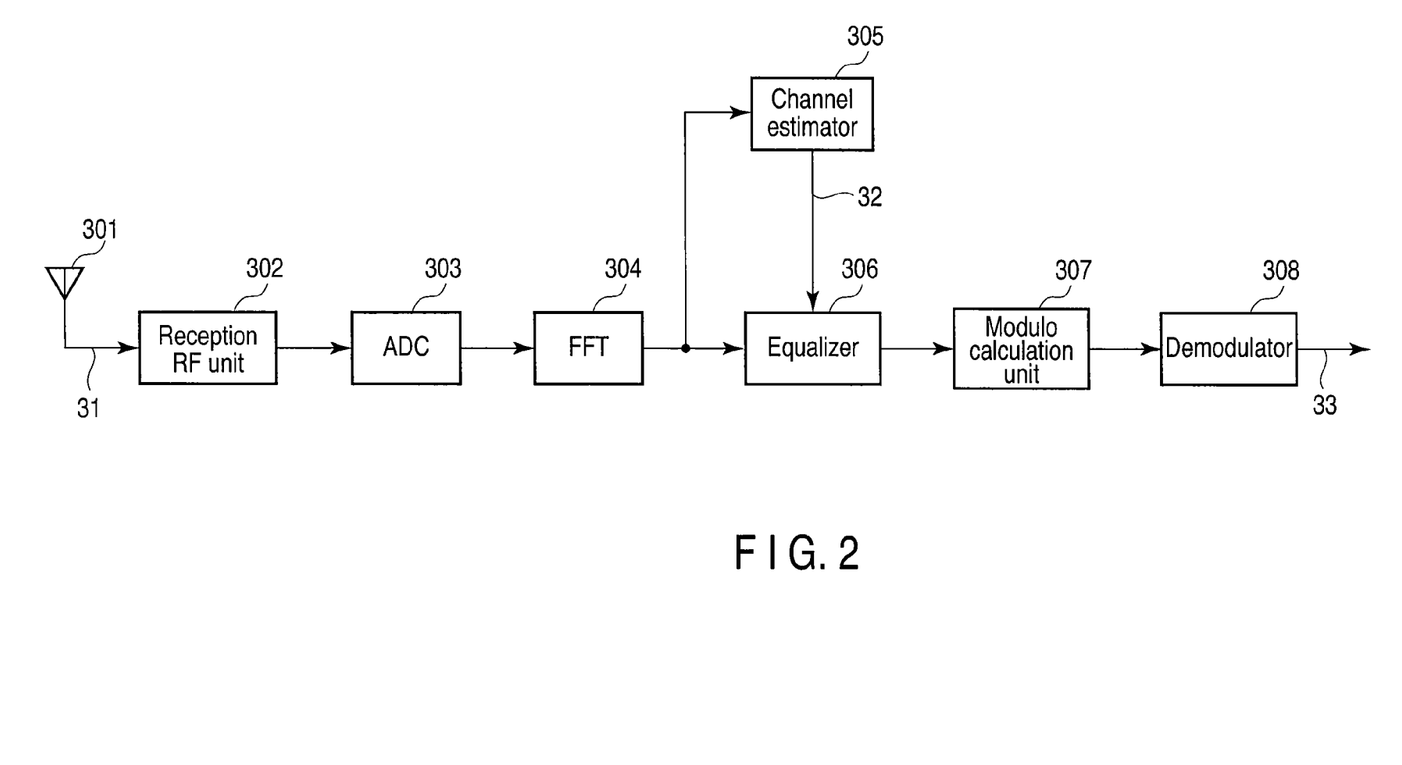
FIG. 2 is a block diagram showing the wireless transmission apparatus according to the first embodiment.

FIG. 2 shows a wireless reception apparatus according to the first embodiment. The wireless reception apparatus depicted in FIG. 2 is provided to each of the wireless terminals of a plurality of users in accordance with the wireless transmission apparatus in FIG. 1 which is provided in a base station. An RF signal transmitted from the wireless transmission apparatus depicted in FIG. 1 is received by a receive antenna 301. A received signal 31 output from the receive antenna 301 is input to a reception RF unit 302.

The reception RF unit 302 has a low-noise amplifier (LNA), a down-converter, and a filter as required. The received signal 31 is amplified in the reception RF unit 302, and then down-converted into a frequency in, e.g., a baseband from a radio frequency (RF) band.

A received signal in the baseband output from the reception RF unit 302 is digitized by an analog-digital converter (ADC) 303, and then demodulated (sub-carrier demodulation) by a fast Fourier transfer (FFT) unit 304. An output signal from the FFT unit 304 is input to a channel estimator 305 and an equalizer 306. An output signal from the equalizer 306 is input to a modulo calculation unit 307. An output signal from the channel estimator 305 is input to the equalizer 306. An output signal from the modulo calculation unit 307 is input to a demodulator 308.

Here, although the FFT unit 304 is provided in the wireless reception apparatus in accordance with a fact that the wireless transmission apparatus depicted in FIG. 1 uses multi-carrier transmission like OFDM transmission, the FFT unit 304 is not required in case of single-carrier transmission, and an output signal from the ADC 303 is directly input to the channel estimator 305 and the equalizer 306. It is to be noted that a digital filter for band limiting may be used after the ADC 303 in any case.

In the modulo calculation unit 307, a modulo arithmetic operation associated with the modulo calculation unit 104 depicted in FIG. 1 is carried out. The channel estimator 305 estimates channels, i.e., estimates channel responses between the transmit antennas 110-1 to 110-$n$ of the wireless transmission apparatus and the respective wireless reception apparatuses. The equalizer 306 performs channel equalization with respect to an output signal from the FFT unit 304 based on a channel estimated value from the channel estimator 305. The demodulator 308 then carries out demodulation processing associated with modulation of the modulators 101 and 102 depicted in FIG. 1, i.e., demapping of modulated signals to signal points.

Figure 3:
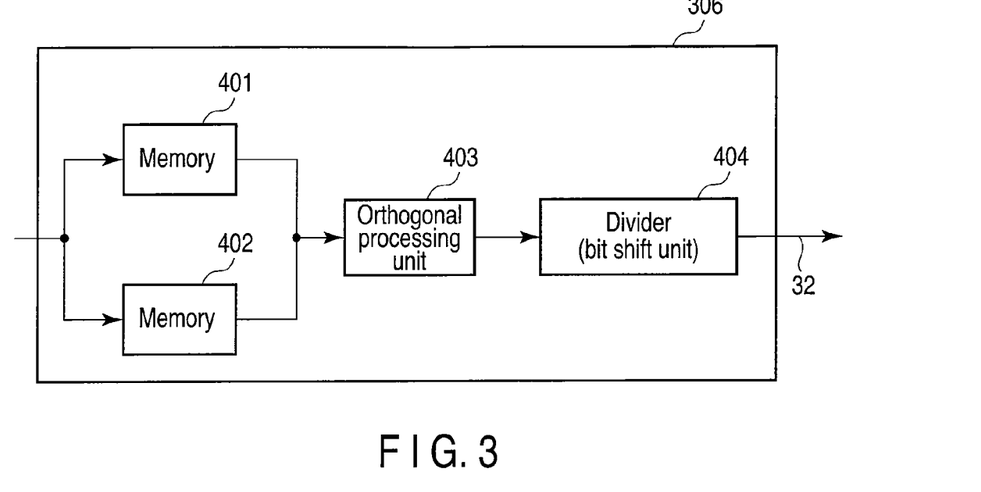
FIG. 3 is a block diagram showing a detail of a channel estimator depicted in FIG. 2.

The channel estimator 305 has, e.g., two memories 401 and 402, an orthogonal processing unit 403, and a divider (a bit shifter) 404 as shown in FIG. 3. Detailed processing of the channel estimator 305 will be explained later.

<Detailed Explanation>

The wireless transmission apparatus and the wireless reception apparatus according to this embodiment will now be explained in detail with particulars of conventional ZF-SDMA, DPC-SDMA, and THP-SDMA.

The wireless transmission apparatus according to this embodiment is provided in a base station of a wireless communication system having the base station and wireless terminals owned by a plurality of users, for example. The wireless communication system utilizes an SDMA scheme that multiplexes the plurality of users (wireless terminals) at the same frequency and the same time by using a plurality of antennas.

It is assumed that the base station has two transmit antennas Tx1 and Tx2 (corresponding to, e.g., the antennas 110-1 and 110-2 depicted in FIG. 1) and each of the wireless terminals of a user 1 and a user 2 has a single receive antenna Rx1 or Rx2. A transmitted signal for the wireless terminals of the user 1 and the user 2 is defined as follows.

$$s=[s_1,s_2]T \quad (1)$$

A noise signal received by the wireless terminals of the user 1 and the user 2 is expressed as follows.

$$n=[n_1,n_2]T \quad (2)$$

Then, a signal y received by the wireless terminals of the user 1 and the user 2 can be written as follows.

$$y = Hs + n \quad (3)$$
$$= \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix}$$

Here, H is a channel matrix between the base station and the wireless terminals, $h_{11}$ is a channel response from the transmit antenna Tx1 to the receive antenna Rx1 of the wireless terminal of the user 1, $h_{12}$ is a channel response from the transmit antenna Tx2 to the receive antenna Rx1, $H_{21}$ is a channel response from the transmit antenna Tx1 to the receive antenna Rx2 of the wireless terminal of the user 2, and $h_{22}$ is a channel response from the transmit antenna Tx2 to the receive antenna Rx2.

Here, the beam former is used to multiply a transmitted signal s (a pilot signal and a data signal) by a weight W represented as follows.

$$W=H^{-1} \quad (4)$$

When an obtained signal is transmitted, the following expression can be obtained.

$$y' = HWs + n \quad (5)$$
$$= s + n$$
$$= \begin{bmatrix} s_1 \\ s_2 \end{bmatrix} + \begin{bmatrix} n_1 \\ n_2 \end{bmatrix}$$

The wireless terminals of the user 1 and the user 2 can respectively receive $s_1$ and $s_2$ alone without interfering with each other, thereby realizing SDMA. This is ZF-SDMA.

On the other hand, DPC-SDMA described in Document 1 will be explained in conjunction with FIGS. 4 and 5. As explained above, ZF-SDMA uses Q obtained by performing QR decomposition with respect to a Hermitian transposition $H^H$ of a channel matrix H. Specifically, Q calculated as represented by the following expression is used as a weight W.

$$H^H = QR \quad (6)$$
$$= \begin{bmatrix} q_{11} & q_{12} \\ q_{21} & q_{22} \end{bmatrix} \begin{bmatrix} r_{11} & r_{12} \\ 0 & r_{22} \end{bmatrix}$$

Here, Q is an orthogonal matrix and is a unitary matrix, and hence an increase in transmission power that is a problem in ZF-SDMA does not occur.

When a transmitted signal is multiplied by the weight W based on beam forming, a received signal of the wireless terminals of the user 1 and the user 2 becomes as follows.

$$y = HWs + n \quad (7)$$
$$= R^H Q^H Qs + n$$
$$= R^H s + n$$
$$= \begin{bmatrix} r_{11}^* & 0 \\ r_{12}^* & r_{22}^* \end{bmatrix} \begin{bmatrix} s_1 \\ s_2 \end{bmatrix} + \begin{bmatrix} n_1 \\ n_2 \end{bmatrix}$$

Therefore, the wireless terminal of the user 1 receives a transmitted signal $s_1$ for the user 1 alone, and the wireless terminal of the user 2 receives both the transmitted signal $s_1$ for the user 1 and a transmitted signal $s_2$ for the user 2.

Figure 4:
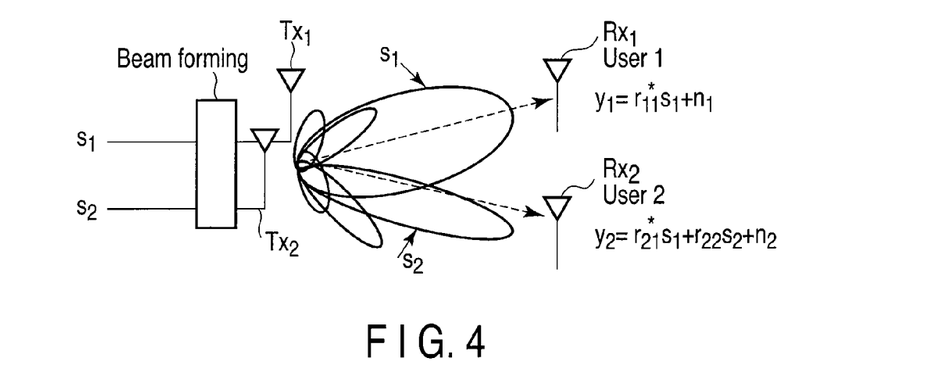
FIG. 4 is a view for explaining an effect of beam forming.

FIG. 4 shows an image of a beam formed by the weight W at this moment. In the example depicted in FIG. 4, the transmitted signal $s_1$ for the user 1 is transmitted with a beam that enables acquisition of a maximum gain in the wireless terminal of the user 1. In regard to this beam for the user 1, since interference suppression does not have to be taken into consideration, this beam can be determined as a beam for maximum ratio combining diversity, thereby providing better performance than those of ZF-SDMA.

A received signal of the wireless terminal of the user 1 becomes $y_1=r_{11}*s_1+n_1$. At this time, a diversity order of the wireless terminal of the user 1 becomes 2. This beam for the user 1 does not take the wireless terminal of the user 2 into consideration, and hence the transmitted signal $s_1$ for the user 1 also reaches the wireless terminal of the user 2. On the other hand, in regard to the transmitted signal $s_2$ for the user 2, an interference with the wireless terminal of the user 1 must be suppressed. As a result, the transmitted signal s2 for the user 2 does not reach the wireless terminal of the user 1, but it does not reach the wireless terminal of the user 2 with a maximum gain either, and a diversity order of the wireless terminal of the user 2 becomes 1.

Meanwhile, the transmitted signal $s_1$ for the user 1 interferes with the wireless terminal of the user 2 if nothing is done. That is, a received signal of the wireless terminal of the user 2 becomes $y_2=r_{21}*s_1+s_{22}*s_2+n_2$, and $r_{21}*s_1$ in this expression is an interference component from $s_1$. Thus, in DPC-SDMA, precoding including feedback processing is carried out with respect to the transmitted signals $s_1$ and $s_2$ as depicted in FIG. 5, and then beam forming is applied. In FIG. 5, a precoding signal s' represented by the following expression is generated.

$$s' = \begin{bmatrix} s_1 \\ s_2 - s_1 \ r_{12}^*/r_{22}^* \end{bmatrix} \quad (8)$$

When such precoding (encoding is processing) is carried out, a final transmitted signal x' obtained by applying beam forming with respect to the precoding signal s' based on the weight W is represented by the following expression.

$$x'=Ws' \quad (9)$$

A received signal y' at this moment can be written as follows.

$$\begin{aligned}
y' &= Hx' + n \\
&= \begin{bmatrix} h_{11} & h_{12} \\ h_{21} & h_{22} \end{bmatrix} \begin{bmatrix} x_1' \\ x_2' \end{bmatrix} + \begin{bmatrix} n_1 \\ n_2 \end{bmatrix} \\
&= HWs' + n \\
&= \begin{bmatrix} h_{11} & h_{12} \\ h_{21} & h_{22} \end{bmatrix} \begin{bmatrix} w_{11} & w_{12} \\ w_{21} & w_{22} \end{bmatrix} \begin{bmatrix} s_1' \\ s_2' \end{bmatrix} + \begin{bmatrix} n_1 \\ n_2 \end{bmatrix} \\
&= R^H Q^H Q s' + n \\
&= \begin{bmatrix} r_{11}^* & 0 \\ r_{12}^* & r_{22}^* \end{bmatrix} \begin{bmatrix} q_{11}^* & q_{21}^* \\ q_{12}^* & q_{22}^* \end{bmatrix} \begin{bmatrix} q_{11} & q_{12} \\ q_{21} & q_{22} \end{bmatrix} \begin{bmatrix} s_1' \\ s_2' \end{bmatrix} + \begin{bmatrix} n_1 \\ n_2 \end{bmatrix} \\
&= R^H Q^H Q B^{-1} s + n \\
&= \begin{bmatrix} r_{11}^* & 0 \\ r_{12}^* & r_{22}^* \end{bmatrix} \begin{bmatrix} q_{11}^* & q_{21}^* \\ q_{12}^* & q_{22}^* \end{bmatrix} \begin{bmatrix} q_{11} & q_{12} \\ q_{21} & q_{22} \end{bmatrix} \begin{bmatrix} 1 & 0 \\ -r_{12}^*/r_{22}^* & 1 \end{bmatrix} \begin{bmatrix} s_1 \\ s_2 \end{bmatrix} + \begin{bmatrix} n_1 \\ n_2 \end{bmatrix} \\
&= R^H B^{-1} s + n \\
&= \begin{bmatrix} r_{11}^* & 0 \\ r_{12}^* & r_{22}^* \end{bmatrix} \begin{bmatrix} 1 & 0 \\ -r_{12}^*/r_{22}^* & 1 \end{bmatrix} \begin{bmatrix} s_1 \\ s_2 \end{bmatrix} + \begin{bmatrix} n_1 \\ n_2 \end{bmatrix} \\
&= \begin{bmatrix} r_{11}^* s_1 \\ r_{22}^* s_2 \end{bmatrix} + \begin{bmatrix} n_1 \\ n_2 \end{bmatrix}
\end{aligned} \quad (10)$$

Figure 5:
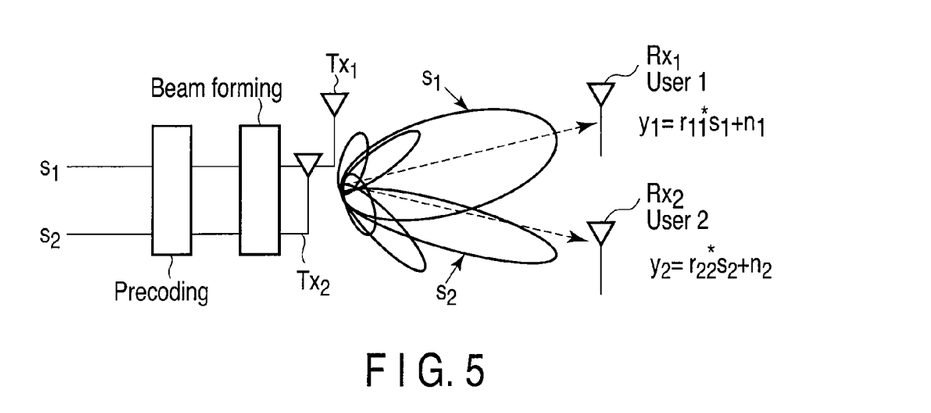
FIG. 5 is a view for explaining effects of precoding and beam forming.

That is, as shown in FIG. 5, the received signal of the wireless terminal of the user 1 becomes $y_1=r_{11}*s_1+n_1$ like the example depicted in FIG. 4 where precoding is not performed. On the other hand, the received signal of the wireless terminal of the user 2 becomes $y_2=r_{22}*s_2+n_2$, and the interference component $r_{21}*s_1$ is canceled. Adopting both beam-forming and precoding in this manner allows the wireless terminals of the user 1 and the user 2 to communicate with the base station without interfering with each other.

Meanwhile, as represented by Expression (10), when precoding for the purpose of canceling alone, i.e., feedback processing alone is carried out with respect to the transmitted signal, the transmitted signal s after feedback processing becomes as follows.

$$s = \begin{bmatrix} s_1 \\ s_2 - s_1 \ r_{12}^{(1)*}/r_{22}^{(1)*} \end{bmatrix} \quad (11)$$

Figure 6:
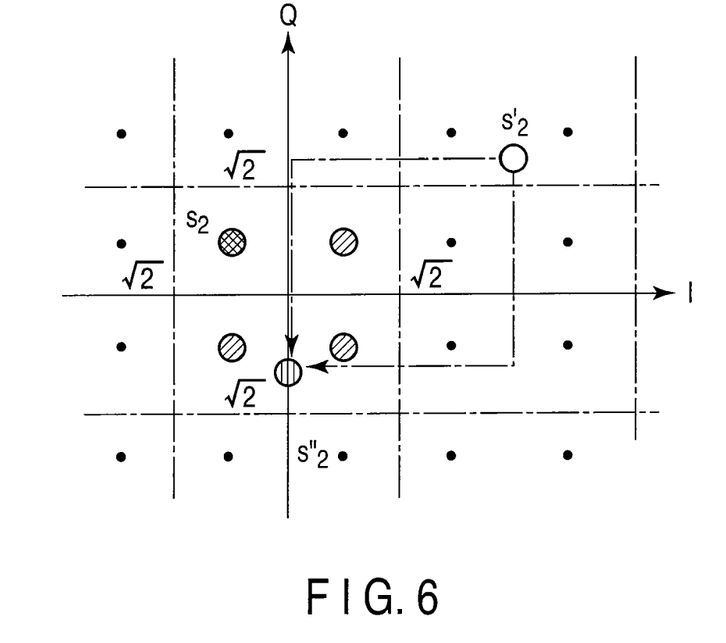
FIG. 6 is a view showing a constellation of transmitted signal points on an IQ plane for explaining the first embodiment.
Figure 7:
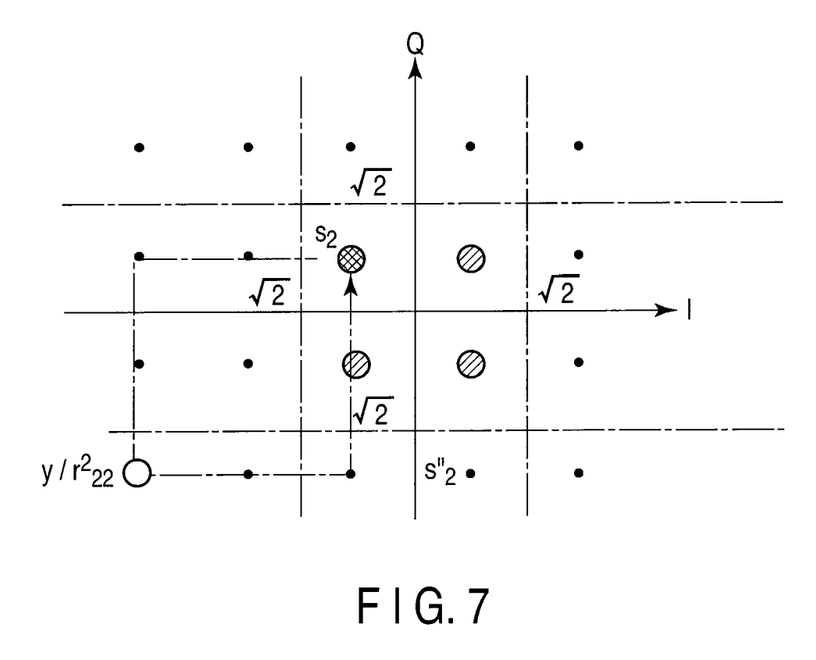
FIG. 7 is a view showing a constellation of received signal points on the IQ plane for explaining the first embodiment.

Here, even if power for each of $s_1$ and $s_2$ is 1, there is a possibility that $s_2-s_1 r_{12}^{(1)*}/r_{22}^{(1)*}$ becomes larger than 1, and hence there is a problem of an increase in transmission power. To avoid this problem, as explained above, a transmission power reduction method using THP, i.e., a method of performing modulo arithmetic with respect to a transmitted signal formed of a complex number is proposed in Document 2. The principle and problems of the transmission power reduction method proposed in Document 2 will now be explained hereinafter with reference to FIGS. 6 and 7. FIG. 6 shows a constellation of transmitted signal points on an IQ plane, and FIG. 7 shows a constellation of received signal points on the IQ plane.

First, an amplitude A of each of the transmitted signals $s_1$ and $s_2$ before canceling is represented by the following expression.

$$A = \pm(\sqrt{M}-1)/m \quad (12)$$

Here, M is a modulation multivalue number, and m is a coefficient required to standardize power as 1. In case of QPSK, M=4 and m=$\sqrt{2}$ are achieved.

A situation where a transmitted signal point $s_2$ at an upper left position is changed to a point $s_{2'}$ at an upper right position after canceling will now be considered. At this time, according to THP, subtraction or addition of a transmitted signal $s_2-s_1 r_{12}^{(1)*}/r_{22}^{(1)*}$ and an integral multiple of N represented by the following expression is performed on a real axis and an imaginary axis, i.e., with respect to a phase I and a phase Q, and power reduction is effected in such a manner that an amplitude falls in the range of $\pm\sqrt{M}/m$, i.e., $\pm\sqrt{2}$.

$$N = 2\sqrt{M}/m \quad (13)$$

Since this processing is modulo arithmetic, this processing is also called modulo reduction in Document 1.

Now, N is subtracted with respect to the phase I once and N is subtracted with respect to the phase Q once in the modulo arithmetic, thereby obtaining the following expression.

$$s_2 - s_1 r_{12}^{(1)*}/r_{22}^{(1)*} - N - jN \quad (14)$$

A case where an amplitude becomes $\pm\sqrt{2}$ or below and weighting is effected by using this value to perform transmission in this situation will now be considered. That is, it is assumed that the point $s_{2'}$ is changed to a point $s_{2''}$ where an amplitude is A or below.

At this moment, on the reception side, if a noise component is ignored, the following is received.

$$r_{22}*(s_2-N-jN) \quad (15)$$

Therefore, when this expression is divided by a gain $r_{22}^*$ corresponding to a channel response in the equalizer 304b, a received signal $s_1$-N-jN becomes an outline circle $y/r_{22}^2$ in FIG. 7. Since this received signal exceeds the amplitude A before feedback processing, adding N in Expression (13) with respect to each of the phase I and the phase Q once on the reception side enables reproducing the signal $s_2$. This scheme is the above-explained THP-SDMA, and it is characterized in that a reception quality can be improved beyond the conventional SDMA scheme while multiplexing users at the same time and the same frequency without increasing transmission power.

Meanwhile, when decoding such a signal as represented by Expression (10) transmitted based on THP-SDMA on the reception side, the wireless terminal of the user 1 must divide a received signal by a gain (a reception gain) $r_{11}^*$ corresponding to a channel response. Since the gain corresponding to the channel response is not known on the reception side, the transmission side must inform the reception side of the gain by using a pilot signal for channel estimation.

Here, there is known a technique that utilizes the same weight as that used at the time of transmitting a data signal for beam forming when transmitting the pilot signal. If this technique is applied to THP-SDMA, performing the modulo arithmetic with respect to the pilot signal to avoid an increase in transmission power causes a received signal to be represented by Expression (15) when the transmission power is increased as represented by Expression (8). Therefore, when the received signal is divided by $s_2$ corresponding to the known pilot signal on the reception side, a channel estimated value $r_{est22}^*$ becomes as follows.

$$r_{est22}^* = r_{22}^*(s_2 - N - jN)/s_2 \qquad (16)$$
$$= r_{22}^* - (N + jN)r_{22}^*/s_2$$

Since the channel estimated value $r_{est22}^*$ in Expression (16) greatly deviates from an original value $r_{22}^*$, reception performances are largely degraded if nothing is done. On the other hand, when the pilot signal is transmitted without effecting the modulo arithmetic, this problem can be avoided. However, since the increased transmission power is standardized, a reception level of the pilot signal is eventually reduced, thereby decreasing a reception quality.

The wireless transmission apparatus according to this embodiment solves a problem of degradation in reception characteristics caused due to a fact that an accurate channel estimated value cannot be obtained in THP-SDMA as explained above. To solve this problem, the feedback loop 100 including the subtracter 103, the modulo calculation unit 104, and the feedback unit 105 performs feedback loop processing with respect to the data signal 14 alone, and then the beam former 106 carries out beam forming. In regard to the pilot signal 13, beam forming is carried out by the beam former 106 without effecting such feedback loop processing. This point will now be explained hereinafter in detail.

The data signal 14 output from the modulator 102 is subjected to feedback loop processing corresponding to processing of $B^{-1}$ in Expression (10) concerning the data signal by the feedback loop 100 including the subtracter 103, the modulo calculation unit 104, and the feedback unit 105. The subtracter 103 and the feedback unit 105 carry out feedback loop processing in a second row of Expression (8). That is, the feedback unit 105 multiplies $s_1$ in the data signals (the transmitted signal $s_1$ for the user 1 and the transmitted signal $s_2$ for the user 2) output from the subtracter 103 by a gain that is $r_{12}^*/r_{22}^*$ to generate $s_1 r_{12}^*/r_{22}^*$, and the subtracter 103 subtracts $s_1 r_{12}^*/r_{22}^*$ from the transmitted signal $s_2$ for the user 2 to produce $s_2 - s_1 r_{12}^*/r_{22}^*$.

The modulo calculation unit 104 reduces an increase in transmission power caused due to feedback loop processing, and adds or subtracts an integral multiple of N with respect to the phase I or the phase Q like Expression (12) to effect adjustment so that predetermined transmission power can be obtained.

The feedback processing data signal 15 output from the feedback loop 100 including the subtracter 103, the modulo calculation unit 104, and the feedback unit 105 is input to the beam former 106. In the beam former 106, the feedback processing data signal 15 is multiplied by a beam forming matrix Q in Expression (10) as a weight, thus effecting beam forming. The beam forming matrix Q is a unitary matrix in this example.

On the other hand, the pilot signal 13 output from the modulator 101 is directly input to the beam former 106. Like beam forming processing with respect to the data signal 14, beam forming processing for the pilot signal 13 is performed by using the beam forming matrix Q which is a unitary matrix in this example, and hence transmission power for the pilot signal is not increased.

As explained above, according to this embodiment, since the pilot signal 13 is not subjected to feedback loop processing, the transmission power is not greatly increased. Therefore, the pilot signal 13 can be transmitted without effecting power normalization. Accordingly, since the pilot signal 13 does not have to be subjected to modulo arithmetic for a reduction in power, the conventional problem can be solved.

It is to be noted that, since Q is the unitary matrix in this embodiment, input power and output power in the beam former 106 are maintained. However, Q does not have to be necessarily the unitary matrix, and it is good enough for Q to be close to an orthogonal matrix.

The wireless reception apparatus depicted in FIG. 2 will now be explained in detail. Since the pilot signal is not subjected to feedback loop processing in the wireless transmission apparatus depicted in FIG. 1, a received pilot signal $y_p$ in the wireless reception apparatus becomes as follows.

$$y_p = Hx_p + n \qquad (17)$$
$$= HQp + n$$
$$= R^H Q^H Q p + n$$
$$= R^H p + n$$
$$= \begin{bmatrix} r_{11}^* & 0 \\ r_{12}^* & r_{22}^* \end{bmatrix} \begin{bmatrix} p_1 \\ p_2 \end{bmatrix} + \begin{bmatrix} n_1 \\ n_2 \end{bmatrix}$$
$$= \begin{bmatrix} r_{11}^* p_1 \\ r_{12}^* p_1 + r_{22}^* p_2 \end{bmatrix} + \begin{bmatrix} n_1 \\ n_2 \end{bmatrix}$$

Here, $p_1$ represents a pilot signal for the user 1, and $p_2$ denotes a pilot signal for the user 2.

Therefore, a received pilot signal at the wireless terminal of the user 1 becomes $y_{p1} = r_{11}^* p_1 + n_1$. When the noise component $n_1$ is ignored, dividing the received pilot signal $y_{p1}$ by the known pilot signal $p_1$ enables obtaining a channel estimated value $r_{11}^*$.

On the other hand, a received pilot signal at the wireless terminal of the user 2 becomes $y_{p2} = r_{12}^* p_1 + r_{22}^* p_2 + n_2$. Therefore, even if the received pilot signal $y_{p2}$ is divided by the known pilot signal $p_2$, an accurate channel estimated value $r_{22}^*$ cannot be obtained since an interference component $r_{12}p_1^*$ from the wireless terminal of the user 1 is present. Thus, in this embodiment, each pilot signal is preferably configured as follows.

Figure 8A:
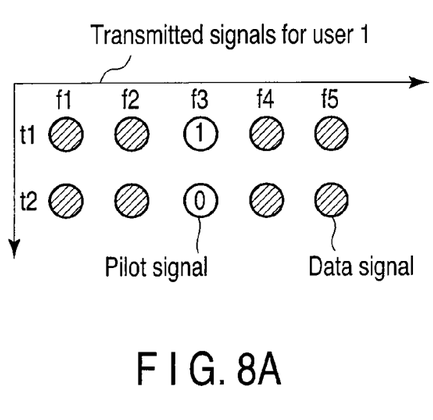
FIGS. 8A and 8B are views showing a first example of transmitted signals for a user 1 and a user 2.
Figure 8B:
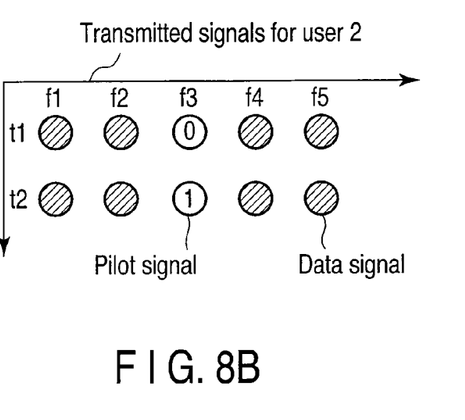

FIGS. 8A and B show transmitted signals for the user 1 and transmitted signals for the user 2 for explaining a first structural example of the pilot signal in this embodiment, and an abscissa represents a frequency whilst an ordinate represents a time, respectively. In FIG. 8A and B, each circle with hatching represents a subcarrier of a data signal, and each outline circle represents a subcarrier of a pilot signal. In this example, the data signal is assigned to each subcarrier having a frequency of f1, f2, f4, or f5, and the pilot signal is assigned to a subcarrier having a frequency of f3.

A first pilot signal in the transmitted signals for the user 1 in FIG. 8A represents $p_1$ in Expression (17), and a second pilot signal in the transmitted signals for the user 2 in FIG. 8B represents $p_2$ in Expression (17). "1" written in the outline circle representing the subcarrier having the frequency f3 means that the pilot signal is transmitted, and "0" means that the pilot signal is not transmitted. In this manner, the first pilot signal in the transmitted signals for the user 1 depicted in FIG. 8A and the pilot signal in the transmitted signals for the user 2 depicted in FIG. 8B are orthogonal to each other in a time direction.

Such transmitted signals for the user 1 and transmitted signals for the user 2 as depicted in FIGS. 8A and 8B are transmitted, a received pilot signal $y_{p,t1}$ at a time t1 is given by the following expression based on Expression (17).

$$y_p, t1 = \begin{bmatrix} r_{11}^* & 0 \\ r_{12}^* & r_{22}^* \end{bmatrix} \begin{bmatrix} p_1 \\ p_2 \end{bmatrix} + \begin{bmatrix} n_1 \\ n_2 \end{bmatrix} \quad (18)$$
$$= \begin{bmatrix} r_{11}^* & 0 \\ r_{12}^* & r_{22}^* \end{bmatrix} \begin{bmatrix} 1 \\ 0 \end{bmatrix} + \begin{bmatrix} n_1 \\ n_2 \end{bmatrix}$$
$$= \begin{bmatrix} r_{11}^* \\ r_{12}^* \end{bmatrix} + \begin{bmatrix} n_1 \\ n_2 \end{bmatrix}$$

In this manner, at the time t1, the pilot signal is transmitted to the wireless terminal of the user 1 alone. As a result, the wireless terminal of the user 1 can evidently obtain a channel estimated value $r_{11}^*$ based on the received signal. Since a signal $r_{12}^*$ which is not required for demodulation can be acquired at the time t1 in the wireless terminal of the user 2, the wireless terminal of the user 2 ignores this signal $r_{12}^*$.

On the other hand, a received pilot signal $y_{p,t2}$ at a time t2 is given by the following expression based on Expression (17).

$$y_p, t2 = \begin{bmatrix} r_{11}^* & 0 \\ r_{12}^* & r_{22}^* \end{bmatrix} \begin{bmatrix} p_1 \\ p_2 \end{bmatrix} + \begin{bmatrix} n_1 \\ n_2 \end{bmatrix} \quad (19)$$
$$= \begin{bmatrix} r_{11}^* & 0 \\ r_{12}^* & r_{22}^* \end{bmatrix} \begin{bmatrix} 0 \\ 1 \end{bmatrix} + \begin{bmatrix} n_1 \\ n_2 \end{bmatrix}$$
$$= \begin{bmatrix} 0 \\ r_{22}^* \end{bmatrix} + \begin{bmatrix} n_1 \\ n_2 \end{bmatrix}$$

As a result, it can be clearly understood that the wireless terminal of the user 2 can obtain the channel estimated value $r_{22}^*$ required for demodulation and the pilot signal is not supplied to the wireless terminal of the user 1.

Using symbol sections which are the times t1 and t2 in this manner enables both the wireless terminals of the user 1 and the user 2 to accurately obtain the channel estimated values.

Figure 9A:
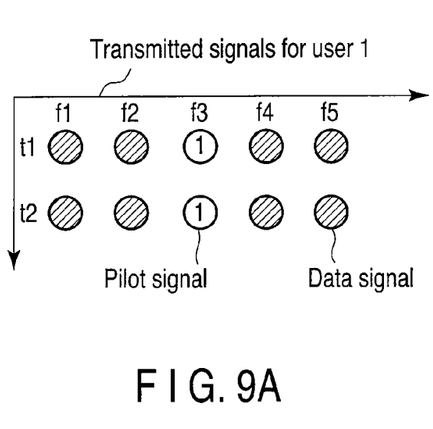
FIGS. 9A and 9B are views showing a second example of transmitted signals for the user 1 and the user 2.
Figure 9B:
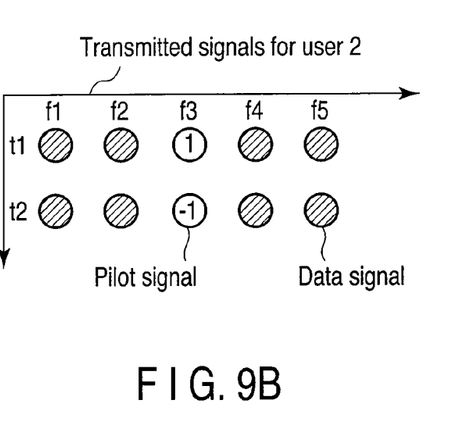

FIGS. 9A and 9B show transmitted signals for the user 1 and transmitted signals for the user 2 for explaining a second structural example of the pilot signal in this embodiment, and how to read the drawings is the same as that for FIGS. 8A and 8B. In this case, a received pilot signal $y_{p,t1}$ at a time t1 is given by the following expression based on Expression (17).

$$y_p, t1 = \begin{bmatrix} r_{11}^* & 0 \\ r_{12}^* & r_{22}^* \end{bmatrix} \begin{bmatrix} p_1 \\ p_2 \end{bmatrix} + \begin{bmatrix} n_1 \\ n_2 \end{bmatrix} \quad (20)$$
$$= \begin{bmatrix} r_{11}^* & 0 \\ r_{12}^* & r_{22}^* \end{bmatrix} \begin{bmatrix} 1 \\ 1 \end{bmatrix} + \begin{bmatrix} n_1 \\ n_2 \end{bmatrix}$$
$$= \begin{bmatrix} r_{11}^* \\ r_{12}^* + r_{22}^* \end{bmatrix} + \begin{bmatrix} n_1 \\ n_2 \end{bmatrix}$$

Likewise, a received pilot signal $y_{p,t2}$ at a time t2 is given by the following expression.

$$y_p, t2 = \begin{bmatrix} r_{11}^* & 0 \\ r_{12}^* & r_{22}^* \end{bmatrix} \begin{bmatrix} p_1 \\ p_2 \end{bmatrix} + \begin{bmatrix} n_1 \\ n_2 \end{bmatrix} \quad (21)$$
$$= \begin{bmatrix} r_{11}^* & 0 \\ r_{12}^* & r_{22}^* \end{bmatrix} \begin{bmatrix} 1 \\ -1 \end{bmatrix} + \begin{bmatrix} n_1 \\ n_2 \end{bmatrix}$$
$$= \begin{bmatrix} r_{11}^* \\ r_{12}^* - r_{22}^* \end{bmatrix} + \begin{bmatrix} n_1 \\ n_2 \end{bmatrix}$$

In this manner, the first pilot signal in the transmitted signals for the user 1 depicted in FIG. 9A and the pilot signal in the transmitted signals for the user 2 shown in FIG. 9B are orthogonal to each other in a time direction like FIGS. 8A and B.

Figure 10A:
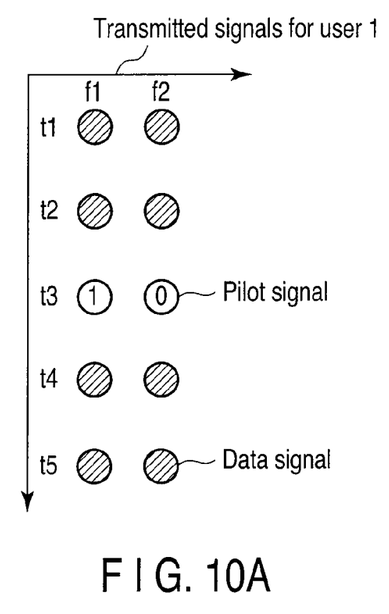
FIGS. 10A and 10B are views showing a third example of transmitted signals for the user 1 and the user 2.
Figure 10B:
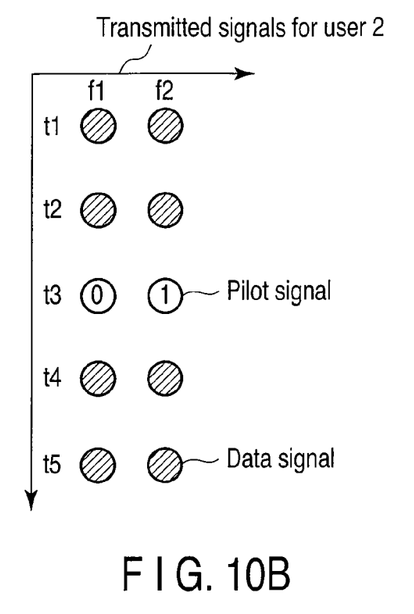
Figure 11A:
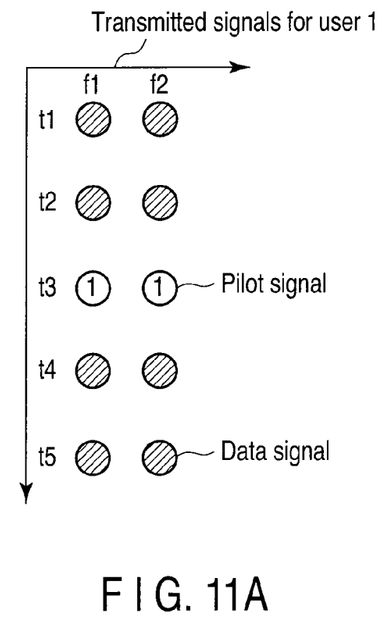
FIGS. 11A and 11B are views showing a fourth example of transmitted signals for the user 1 and the user 2.

It is to be noted that the data signals and the pilot signals are assigned to the different frequencies in FIGS. 8A and 8B and FIGS. 9A and 9B, but data signals and pilot signals may be assigned to different times as shown in FIGS. 10A and 10B and FIGS. 11A and 11B. In this case, first pilot signals in transmitted signals for the user 1 depicted in FIG. 10A are orthogonal to pilot signals in transmitted signals for the user 2 depicted in FIG. 10B in a frequency direction. Likewise, first pilot signals in transmitted signals for the user 1 depicted in FIG. 11A are orthogonal to pilot signals in transmitted signals for the user 2 shown in FIG. 11B in a frequency direction.

Processing by the channel estimator 306 shown in FIG. 3 will now be explained. In FIG. 7, the memories 401 and 402 hold received pilot signals at the times t1 and t2, respectively. The orthogonal processing unit 403 performs orthogonal processing with respect to the pilot signals held in the memories 401 and 402 to separate the pilot signals. The divider 404 normalizes values of the pilot signals separated by the orthogonal processing unit 403 to effect channel estimation.

For example, focusing on the wireless terminal of the user 1, a first row ($y_{p,t1}$(t)) in Expression (18) is held in the memory 401, and a first row ($y_{p,t2}$(1)) in Expression (19) is held in the memory 402. Likewise, in the wireless terminal for the user 2, a second row ($y_{p,t1}$(2)) in Expression (18) is held in the memory 401, and a second row ($y_{p,t2}$(2)) in Expression (19) is held in the memory 402. The orthogonal processing unit 403 and the divider 404 specifically perform the following processing.

In the wireless terminal of the user 1, the signals held in the memories 401 and 402 are added in the orthogonal processing unit 403, and then an obtained result is divided by "2" in the divider 404. This processing can be represented in the form of the following expression.

$$r_{est11}^* = (y_{p,t1}(1) + y_{p,t2}(1))/2 \quad (22)$$

In the wireless terminal of the user 2, the signals held in the memories 401 and 402 are subtracted in the orthogonal processing unit 403 and then divided by "2" in the divider 404 as represented by the following expression.

$$r_{est22}^* = (y_{p,t1}(2) + y_{p,t2}(2))/2 \quad (23)$$

It is to be noted that the processing of dividing an output signal from the orthogonal processing unit 403 by "2" in the divider 404 can be realized based on bit shift.

Figure 11B:
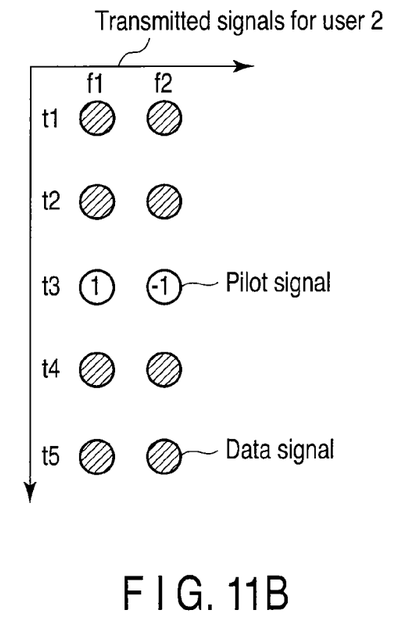

In this manner, channel estimation can be accurately carried out in both the wireless terminals of the user 1 and the user 2. That is because the pilot signals are orthogonal to each other between the user 1 and the user 2 in the time direction as shown in FIGS. 8A and 8B and FIGS. 9A and 9B. It is apparent that the same effect can be obtained when the pilot signals are orthogonal to each other between the user 1 and the user 2 in the frequency direction as depicted in FIG. 10A and FIGS. 11A and 11B.

A first pilot signal structure depicted in FIGS. 8A and 8B and FIGS. 10A and 10B is characterized in that a channel estimated value can be readily obtained without requiring processing on the reception side. On the other hand, the first pilot signal structure has a section in which the pilot signal is not transmitted, whereas a second pilot signal structure shown in FIGS. 9A and 9B and FIGS. 11A and 11B has an excellent power efficiency since the pilot signal is constantly transmitted. In fact, according to the second pilot signal structure, two symbols of the received pilot signals are subjected to in-phase addition on the reception side to obtain a channel estimated value, thereby enabling more accurate channel estimation.

As explained above, according to the first embodiment, the feedback loop processing and the modulo arithmetic are not executed for transmission of the pilot signal in THP-SDMA, and the beam forming processing alone is applied. In other words, the data signal is subjected to the feedback loop processing and then to the beam forming processing to eliminate interferences, and the pilot signal is subjected to the beam forming processing without effecting the feedback loop processing.

As a result, an increase in transmission power for the pilot signal can be avoided, a reception quality of the pilot signal can be improved, and excellent reception characteristics can be obtained based on accurate channel estimation. That is, the pilot signal can be transmitted without increasing transmission power. Therefore, on the reception side, the pilot signal can be accurately received at a further strong level, and an accurate channel estimated value can be obtained, thus improving reception characteristics. In this case, when the modulo arithmetic is executed in the feedback loop processing for the data signal, an increase in transmission power for the data signal can be avoided.

Although the example where the pilot signals are transmitted to the wireless terminals of two users, i.e., the user 1 and the user 2 has been explained above, the same effect can be obtained in a situation where the pilot signals are transmitted to two or more users when the number of orthogonal sequence used for orthogonalization of the pilot signals between users is increased.

(Second Embodiment)

Figure 12:
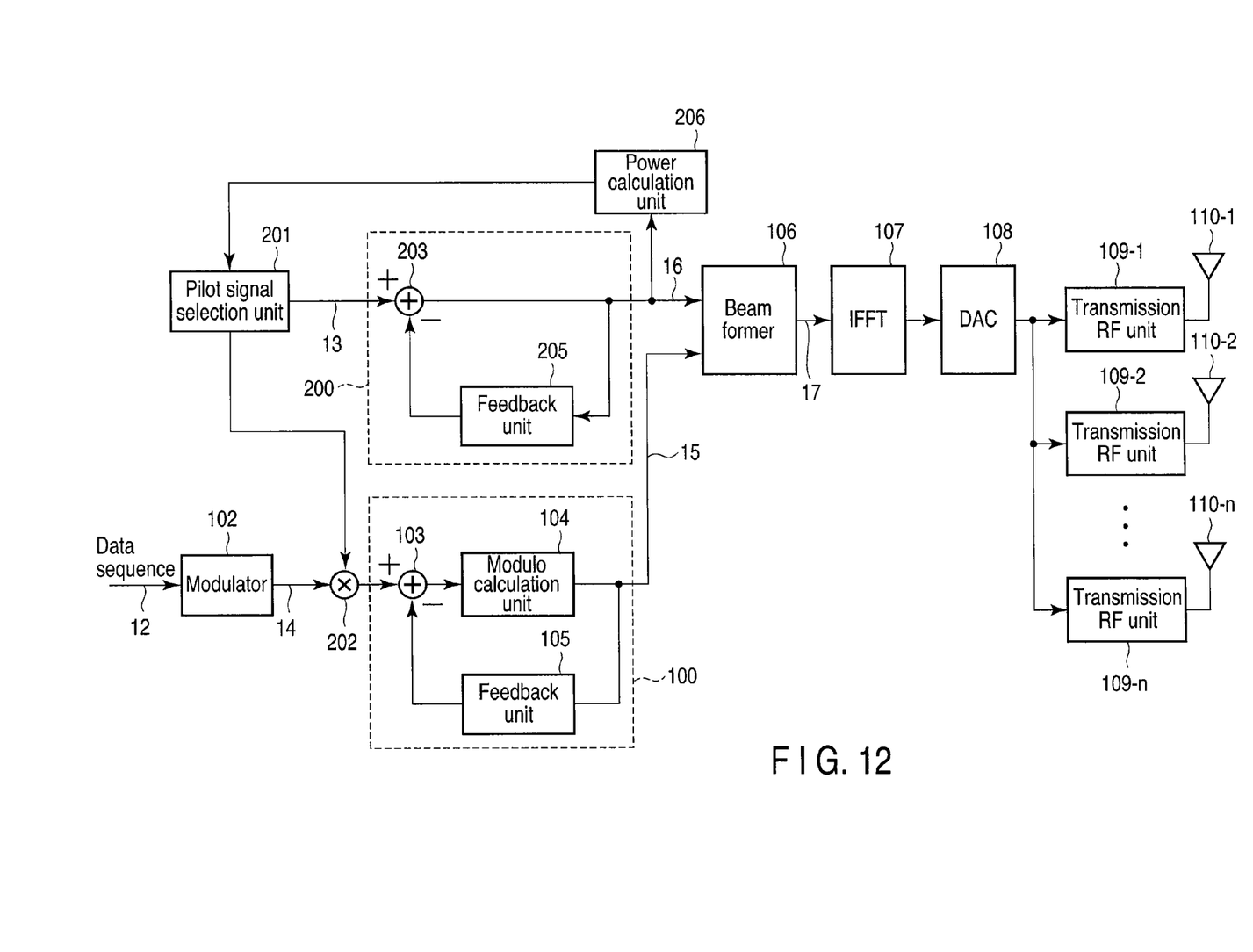
FIG. 12 is a block diagram showing a wireless transmission apparatus according to a second embodiment.

A second embodiment will now be explained with reference to FIG. 12. Giving a description on a difference from the wireless transmission apparatus according to the first embodiment depicted in FIG. 1, the modulator 101 for the pilot sequence shown in FIG. 1 is eliminated, and a pilot signal selection unit 201, a pilot signal calculation unit 202, a subtracter 203, a feedback unit 205, and a power calculation unit 206 are added. The subtracter 203 and the feedback unit 205 form a feedback loop 200 for pilot signals.

In the pilot signal selection unit 201, a plurality of different pilot signal candidates are prepared (held) in advance, and one pilot signal is selected in accordance with transmission power calculated by the power calculation unit 206. The selected pilot signal 13 is subjected to feedback loop processing by the feedback loop 200 including the subtracter 203 and the feedback unit 205. In this case, the subtracter 203 and the feedback unit 205 execute processing of multiplying $B^{-1}$ in Expression (10) or later-explained Expression (25), thereby generating a feedback processing pilot signal 16. The feedback processing pilot signal 16 is input to a beam former 106 and also input to the power calculation unit 206.

Now, it is assumed that a channel matrix H is specifically as follows.

$$H = \begin{bmatrix} 1 & 2 \\ 3 & -5 \end{bmatrix} \quad (24)$$

When a technique using QR decomposition, a received signal y becomes as represented by the following expression based on Expression (10).

$$\begin{aligned} y &= Hx + n \quad (25) \\ &= HQ^H B^{-1} p + n \\ &= \begin{bmatrix} 1 & 2 \\ 3 & -5 \end{bmatrix} \begin{bmatrix} -0.4472 & -0.8944 \\ -0.8944 & 0.4472 \end{bmatrix} \underbrace{\begin{bmatrix} 1 & 0 \\ -0.6364 & 1 \end{bmatrix} \begin{bmatrix} p_1 \\ p_2 \end{bmatrix}}_{x} + \begin{bmatrix} n_1 \\ n_2 \end{bmatrix} \end{aligned}$$

The pilot signal selection unit 201 prepares various pilot signal candidates (which will be referred to as pilot signal sets) in advance as explained above. For example, it is assumed that a set 1 is $(1,1)^T$, a set 2 is $(1,-1)^T$, and a set 3 is $(-1,1)^T$, and a set 4 is $(-1,-1)^T$. The power calculation unit 206 calculates transmission power when the pilot signal selection unit 201 selects each pilot signal set, and one pilot signal set having the lowest transmission power is selected by the pilot signal selection unit 201.

Here, $Q^H$ becomes unitary in the technique using QR decomposition. Therefore, the power does not vary before and after a pilot signal is multiplied by $Q^H$ (a weight W) in the beam former 106, and hence the power can be calculated on a previous stage of the beam former 106 as shown in FIG. 12. If $Q^H$ is not a unitary matrix or an orthogonal matrix, measuring power on a rear stage of the beam former 106 can suffice.

In regard to the transmission power of each pilot signal set measured on the previous stage of the beam former 106, according to the specific numerical example, the set 1 has transmission power of 1.9177, the set 2 has transmission power of 1.0641, the set 3 has transmission power of 1.0641, and the set 4 has transmission power of 1.9177. Therefore, in this example, using the set 2 or the set 3 enables reducing the transmission power to a minimum level to transmit the pilot signal. It is to be noted that the set 2 is used in this example.

Therefore, in the pilot signal transmission unit 201, the set 2 is eventually selected, and the pilot signal of the set 2 is transmitted.

Here, a received pilot signal yp can be written with generalized variables based on Expression (10) as follows.

$$y_p = \begin{bmatrix} r_{11}^* p_1 \\ r_{22}^* p_2 \end{bmatrix} + \begin{bmatrix} n_1 \\ n_2 \end{bmatrix} \quad (26)$$

$$= \begin{bmatrix} r_{11}^* \\ -r_{22}^* \end{bmatrix} + \begin{bmatrix} n_1 \\ n_2 \end{bmatrix}$$

Since a reception side does not have information indicating which pilot signal set is transmitted on a transmission side, a user utilizes, e.g., a predetermined pilot signal set (e.g., the set 1) to perform channel estimation. As a result, a wireless terminal of a user 1 recognizes $r_{11}^*$ as a channel estimated value, and a wireless terminal of a user 2 recognizes $-r_{22}^*$ as a channel estimated value, respectively. In the wireless terminal of the user 2, a wrong channel estimated value is obtained. Since the wireless terminal of the user 2 tries demodulation of data by using the wrong channel estimated value if nothing is done, erroneous modulation is carried out.

To avoid this problem, the calculator 202 multiplies (or divides) a data signal 14 by a pilot signal 13 selected by the pilot selection unit 201. As a result, in regard to the data signal for the wireless terminal of the user 2, a transmitted signal is constantly multiplied by −1, and this pilot signal is offset by the channel estimated value $-r_{22}^*$, thereby enabling accurate reception.

It is to be noted that the pilot signal set with which the transmission power is reduced to the minimum level is selected in this embodiment, but transmission power is determined based on a sum total of a plurality of carriers in case of a multi-carrier signal in, e.g., OFDM or OFDMA, and hence it is possible to select a pilot signal set with which transmission power is reduced as a whole or a pilot signal set with which PAPR is reduced at minimum.

Further, although the pilot signal set with which transmission power is reduced at minimum is selected from finite sets in this embodiment, the number of sets is arbitrary. For example, $(1,1)^T$ may be determined as basic without having sets, a phase or an amplitude of a pilot signal of an antenna 1 or an antenna 2 may be arbitrarily set, and a pilot signal with which transmission power is reduced at minimum may be searched to be used as the pilot signal.

As explained above, in this embodiment, since a plurality of pilot signals in THP-SDMA are prepared, each pilot signal can be transmitted without increasing transmission power. Furthermore, when a data signal is multiplied by a selected pilot signal, a user can demodulate the data signal even though he/she does not the selected pilot signal. That is, the reception side can obtain an accurate channel estimated value, thus improving reception characteristics.

That is, when a data signal is subjected to feedback loop processing and then to beam forming processing to be transmitted, interferences can be removed, and one pilot signal with which transmission power is reduced at minimum is selected from the plurality of pilot signals. When this selected pilot signal is subjected to the feedback processing and then to the beam forming processing to be transmitted, the transmission power for the pilot signal can be prevented from being increased even though the feedback processing is carried out with respect to the pilot signal, thus improving a reception quality of the pilot signal.

(Third Embodiment)

Figure 13:
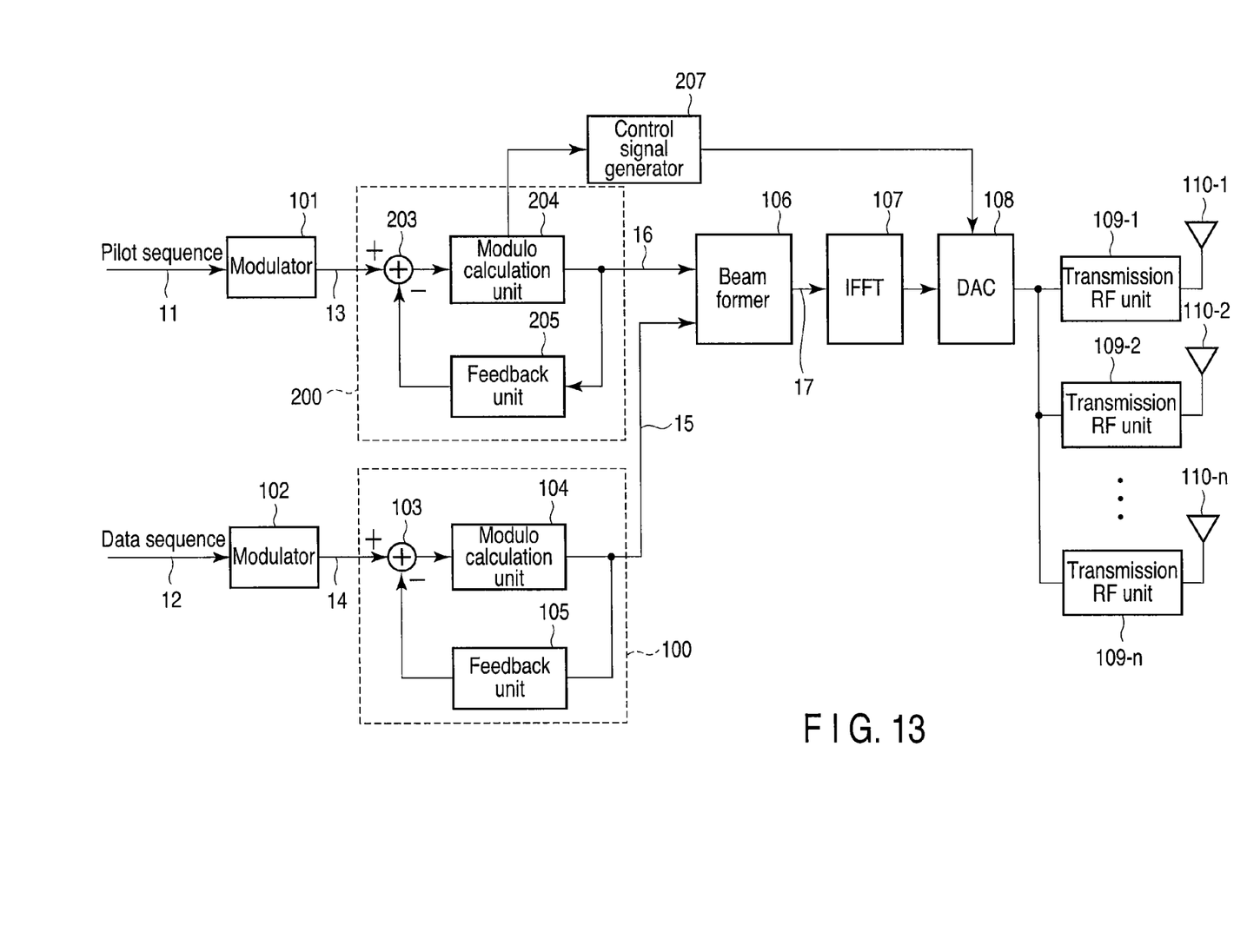
FIG. 13 is a block diagram showing a wireless transmission apparatus according to a third embodiment.

A third embodiment will now be explained with reference to FIG. 13. Giving a description on a difference from the wireless transmission apparatus according to the first embodiment depicted in FIG. 1, a modulo calculation unit 204 is added to a feedback loop 200 for a pilot signal 13 in a wireless transmission apparatus according to this embodiment. That is, in this embodiment, feedback loop processing including modulo arithmetic and beam former processing are carried out with respect to both the pilot signal 13 and a data signal 14.

Moreover, in this embodiment, a later-explained control signal generation unit 207 is provided, and a control signal generated in this unit is input to, e.g., a DAC 108 to be transmitted to a reception side.

Now, as represented by Expression (14), when transmission power for a pilot signal is set to have a predetermined amplitude by subtracting N from a phase I once and subtracting N from a phase Q once in the modulo calculation unit 204, a pilot signal which is obtained after the modulo arithmetic and output from the modulo calculation unit 204 is represented by the following expression.

$$\begin{bmatrix} p_1 \\ p_2 - p_1 \, r_{12}^{(1)*} / r_{22}^{(1)*} - N - jN \end{bmatrix} \quad (27)$$

Therefore, a received pilot signal becomes as follows.

$$\begin{bmatrix} r_{11}^* p_1 \\ r_{22}^* (p_2 - N - jN) \end{bmatrix} \quad (28)$$

In this case, although a wireless terminal of a user 1 can obtain a channel estimated value $r_{11}^*$ by performing multiplication using a predetermined pilot signal $p_1$, a wireless terminal of a user 2 cannot obtain a channel estimated value $r_{22}^*$ as explained in conjunction with the problem in the section "Background Art". Thus, in this embodiment, the control signal generation unit 207 generates information indicative of calculation contents of the modulo calculation unit 204, which is specifically information indicating how many times N is added to a signal in the modulo calculation unit 204, as a control signal, and informs the reception side of this generated signal. For example, in this embodiment, the reception side is informed of information indicative of −1 with respect to the phase I or −1 with respect to the phase Q by using the control signal. Since this control signal represents an integer, small bits can suffice, and a transmission throughput is not reduced.

Additionally, since M or m in $N=2\sqrt{M}/m$ is a value obtained when a modulation scheme is determined, the wireless reception apparatus can obtain a value of N.

That is, the wireless reception apparatus can receive and demodulate the control signal transmitted in this manner, and can use the obtained N to calculate $p_2-N-jN$ in Expression (28). Therefore, when a received pilot signal in Expression (28) is divided by the thus calculated $p_2-N-jN$, a correct channel estimated value $r_{22}^*$ can be obtained.

As explained above, according to this embodiment, since a pilot signal can be accurately transmitted and channel estimation can be accurately effected in the wireless reception apparatus, reception characteristics of the wireless reception apparatus can be greatly improved. That is, when both a data signal and a pilot signal are subjected to the feedback loop processing including the modulo arithmetic and then to the beam forming to be transmitted, the reception side is informed of information indicative of contents of the modulo arithmetic performed with respect to the pilot signal. As a result, the reception side can accurately obtain a channel estimated value from the received pilot signal. Therefore, transmission power for the pilot signal can be prevented from being increased, and a reception quality can be improved.

We explained our embodiments regarding THP-SDMA. However the embodiments can be also applied to VP-SDMA which is written in B. H. Hochwald, C. B. Peel, and A. L. Swindlehurst, "A vector perturbation technique for near-capacity multiantenna multiuser commnunication-part II: perturbation," IEEE Trans. on Commun., vol. 53, No. 3, pp. 537-544, March 2005.

This VP-SDMA is a special case of THP-SDMA where matrix B in THP-SDMA becomes identity matrix in VP-SDMA. The beamforming matrix for pilot incorporates unitary Q matrix and the beamforming matrix for data uses matrix uses channel inversion matrix. The interference remains for pilots at the reviver as explained in the $1^{st}$ embodiment, it is avoidable with orthogonal pilots as in FIGS. 8-11.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A wireless transmission method comprising:
performing feedback loop processing including subtracting a feedback data signal obtained by multiplying a first feedback processing data signal by a gain from an input data signal to generate a second feedback processing data signal;
performing beam forming processing with respect to both the second feedback processing data signal and at least one pilot signal for channel estimation to generate a beam-formed signal; and
transmitting the beam-formed signal by a plurality of antennas.

2. A wireless transmission apparatus comprising:
a feedback loop configured to perform feedback loop processing including subtracting a feedback data signal obtained by multiplying a first feedback processing data signal by a gain from an input data signal to generate a second feedback processing data signal;
a beam former configured to perform beam forming processing with respect to both the second feedback processing data signal and at least one pilot signal for channel estimation to generate a beam-formed signal; and
a transmission unit configured to transmit the beam-formed signal.

3. The apparatus according to claim 2, wherein the transmission unit is configured to transmit the beam-formed signal by using a plurality of antennas.

4. The apparatus according to claim 2, wherein the feedback loop further includes a calculation unit configured to perform calculation of reducing an increase in transmission power caused due to the feedback loop processing with respect to the second feedback processing data signal.

5. The apparatus according to claim 4, wherein the calculation includes modulo arithmetic.

6. The apparatus according to claim 2, wherein the pilot signal includes a first pilot signal for a first wireless receiver of a first user and a second pilot signal for a second wireless receiver of a second user, and the first pilot signal and the second pilot signal are orthogonal to each other.

7. The apparatus according to claim 6, wherein the first pilot signal and the second pilot signal are orthogonal to each other in a time direction.

8. The apparatus according to claim 6, wherein the first pilot signal and the second pilot signal are orthogonal to each other in a frequency direction.

9. A wireless transmission method comprising:
performing first feedback loop processing including subtracting a feedback data signal obtained by multiplying a first feedback processing data signal by a first gain from an input data signal to generate a second feedback processing data signal;
selecting one pilot signal with which transmission power becomes minimum from a plurality of prepared pilot signals for channel estimation;
performing second feedback loop processing including subtracting a feedback pilot signal obtained by multiplying a first feedback processing pilot signal by a second gain from the one pilot signal to generate a second feedback processing pilot signal;
performing beam forming processing with respect to the second feedback processing data signal and the second feedback processing pilot signal to generate a first beam-formed signal and a second beam-formed signal, respectively;
calculating the transmission power from one of the second feedback processing pilot signal and the second beam-formed signal; and
transmitting the first beam-formed signal and the second beam-formed signal by using a plurality of antennas.

10. A wireless transmission apparatus comprising:
a first feedback loop configured to perform first feedback loop processing including subtracting a first feedback data signal obtained by multiplying a data signal by a first gain from an input data signal to generate a second feedback processing data signal;
a selection unit configured to select one pilot signal with which transmission power becomes minimum from a plurality of prepared pilot signals for channel estimation;
a second feedback loop configured to perform second feedback loop processing including subtracting a feedback pilot signal obtained by multiplying a first feedback processing pilot signal by a second gain from the one pilot signal to generate a second feedback processing pilot signal;
a beam former configured to perform beam forming processing with respect to the second feedback processing data signal and the second feedback processing pilot signal to generate a beam-formed data signal and a beam-formed pilot signal, respectively;
a power calculation unit configured to calculate the transmission power from one of the second feedback processing pilot signal and the beam-formed pilot signal; and
a transmission unit configured to transmit the beam-formed data signal and the beam-formed pilot signal.

11. The apparatus according to claim 10, wherein the transmission unit is configured to transmit the beam-formed data signal and the beam-formed pilot signal by using a plurality of antennas.

12. The apparatus according to claim 10, further comprising:
a calculator configured to perform multiplication or division of the one selected pilot signal and the input data signal and provide the input data signal after multiplication or division to the first feedback loop.

13. The apparatus according to claim 10, wherein the first feedback loop further includes a calculation unit configured to perform calculation for reducing an increase in transmission power caused due to the first feedback loop processing with respect to the second feedback processing data signal.

14. The apparatus according to claim 10, wherein the first feedback loop includes a first calculation unit configured to perform calculation for reducing an increase in transmission power caused due to the first feedback loop processing with respect to the second feedback processing data signal, the second feedback loop includes a second calculation unit configured to perform calculation for reducing an increase in transmission power caused due to the second feedback loop processing with respect to the second feedback processing pilot signal, and the apparatus further comprises a notification unit configured to notify information indicative of contents of the second calculation.

\* \* \* \* \*